Sept. 6, 1966 V. M. GRABOVEZ 3,271,229
SURFACE TREATMENT OF ORGANIC THERMOPLASTIC FILM AND PRODUCT
Filed Nov. 5, 1963 2 Sheets-Sheet 1
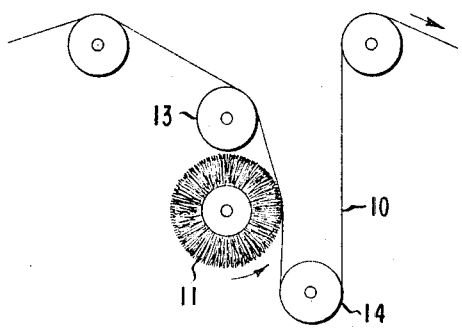
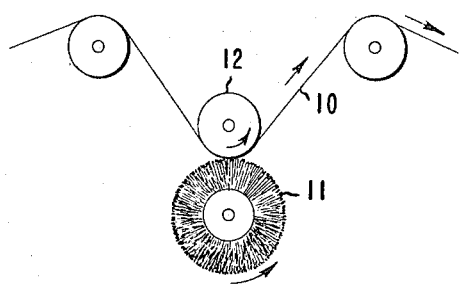
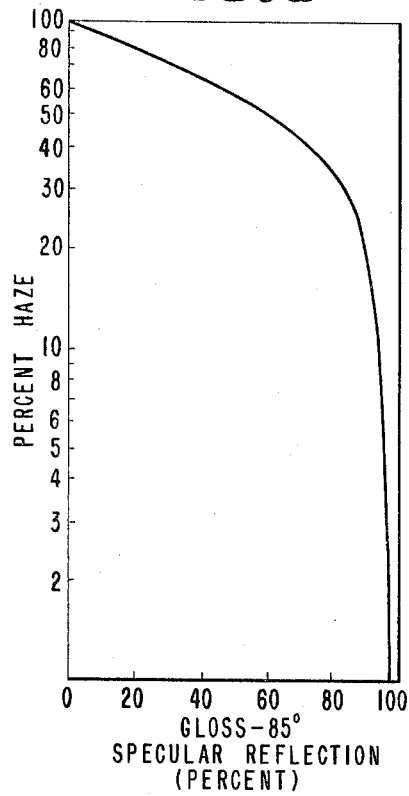
INVENTOR
VICTOR M. GRABOVEZ
BY
ATTORNEY

3,271,229
SURFACE TREATMENT OF ORGANIC THERMOPLASTIC FILM AND PRODUCT
Victor M. Grabovez, Columbus, Ohio, assignor to E. I. du Pont de Nemours and Company, Wilmington, Del., a corporation of Delaware
Filed Nov. 5, 1963, Ser. No. 321,566
8 Claims. (Cl. 161—164)

This invention relates to improvements in organic thermoplastic film. Specifically, it relates to the improvement in slip of a thermoplastic film with a minimum increase in haze.

In organic thermoplastic films which are employed for packaging and glazing, high transparency and good slip, i.e., low friction, are required. The properties of the film which produce these qualities are competitive in nature; in general clear films have poor slip and hazy films have good slip. The interdependence of slip and haze has heretofore prevented full realization of the potential of certain polymeric films for use in packaging application as well as for certain other uses. For example, poor slip, which is associated with films of good transparency, apparent as tackiness of the film when two surfaces are in sliding contact, causes practical difficulties such as poor roll formation, since successive layers on a roll are incapable of even minor sliding adjustments required for good roll formation, and is apparent in poor running on converting, e.g., automatic bag making and packaging machinery, and tape recorders. In production, measurement of the coefficient of friction by the method of the present invention, of deformed and misshapened rolls reveals that these all have coefficients greater than 0.6, while coefficients less than this produce satisfactory rolls. Regardless of the end use of a film, whether the film is transparent, translucent or opaque, surface haze is often highly critical. Total haze, which consists of internal haze as well as surface haze, is critical in applications where high transparency is essential. For example, in decorative inspection windows on certain types of food cartons, a high haze level will give the false impression of spoilage of the contents, thereby seriously impairing the utility of the film in this use. To the average observer, haze levels greater than 6% (as measured by ASTM method D-1003) are readily apparent to the naked eye, thus total haze must not exceed this limit in such uses and treatment processes which produce surface haze must be limited accordingly. Further, there are uses, which employ, hazy or translucent films, wherein surface haze, though readily visible, is not objectionable per se, but is objectionable for the secondary effects it produces. For example, certain hazy films may be treated to improve frictional characteristics; the extent of increase of total haze caused such treatment, although it might exceed the 6% level, could be negligible in comparison to the initial, largely internal haze. However, with visible surface haze, the appearance of the film is subject to easy marring by handling; oils from the skin are transferred to the film surface, and by virtue of the closeness of the refractive index of these oils to that of the film, they blot out the visible haze to leave unsightly finger marks. This effect also occurs with pigmented films, where such surface contaminants can mar the uniform appearance of the surface if visible surface haze exists. Therefore, since clear films are normally employed for transparent inspection windows, a level of 6% total haze is in actuality a limitation on the increase of surface haze by brushing, and for those where surface haze alone is significant, a level of 6% surface haze is considered the maximum tolerable. Surface haze may be determined, by the method indicated, by first determination of the total haze, then by wetting both surfaces of the film with a liquid having a refractive index the same as the film, measurement of internal haze, and subtraction of this value from the total haze to yield the surface haze value. (This value, of course, is for both surfaces, but it is obvious from the foregoing how the haze of one surface could be determined.)

Apart from the optical effects here discussed, high surface haze results in metallized films of poor appearance by reason of a reduction in metallic luster. Likewise, beyond the effect of appearance, the surface of hazy films performs poorly in magnetic tape application for precision uses such as for high speed data processing, where extremely thin magnetic coatings are coming into widespread use.

Means to improve the slip of organic thermoplastic films of high transparency exist, but these are not always suitable. For example, it is known to apply slip agents, and finely divided powders to the surface of the film; these often interfere with the ultimate use of the films, or lack permanence. Another approach to provide a slippery film has been to emboss very fine nodules on the surface of the film. If this is done on the cast film, near the beginning of the process line, subsequent process steps such as stretching, may, to a large extent, wash out the desired surface. Secondly, it is difficult to obtain the desired surface on embossing rolls, and to have the film to conform to the surface unless the film is molten. Obviously it is undesirable to heat a stretch-oriented film to the softening point in order to achieve this embossing. Further, a production problem arises in embossing films in that the exudate from the film gradually forms on the embossing rolls and nullifies the effect and produces film of poor slip, or else produces surface haze as result of the visible embossing by the accumulated exudate.

It is, therefore, an object of this invention to provide an organic thermoplastic film having high transparency and good slip. It is a further object of this invention to provide an organic thermoplastic film having a satisfactorily low level of surface haze and good slip characteristics. A still further object is to provide a method of producing an oriented thermoplastic film having high transparency and good slip. The foregoing and related objects will more clearly appear from the detailed description which follows.

The objects are realized by the present invention which, in brief, comprises contacting the surface of a transparent, thermoplastic organic film with a driven brush, the fibers (i.e., bristles) of said brush being of a non-metallic material having an elastic modulus within an order of magnitude of said film, and less than $2 \times 10^6$ pounds per square inch (p.s.i.), and remaining substantially the same (constant) while in contact with said film, to produce a uniformly buffed surface on said film having a coefficient of friction less than 0.6 and further characterized by a microscopic orange peel structure, and at least $1 \times 10^6$ asperities per square inch of film surface, said asperities having a maximum average height of 5 microinches, said film having a surface haze of less than 6%.

The invention will now be more specifically described with reference to the accompanying drawings wherein:

FIG. 1 is a schematic illustration of one arrangement of apparatus suitable for carrying out the process of this invention;

FIG. 2 is a schematic illustration of another arrangement of apparatus;

FIG. 3 is a graph illustrative of the relationship between film gloss and haze, and;

Figure 4:
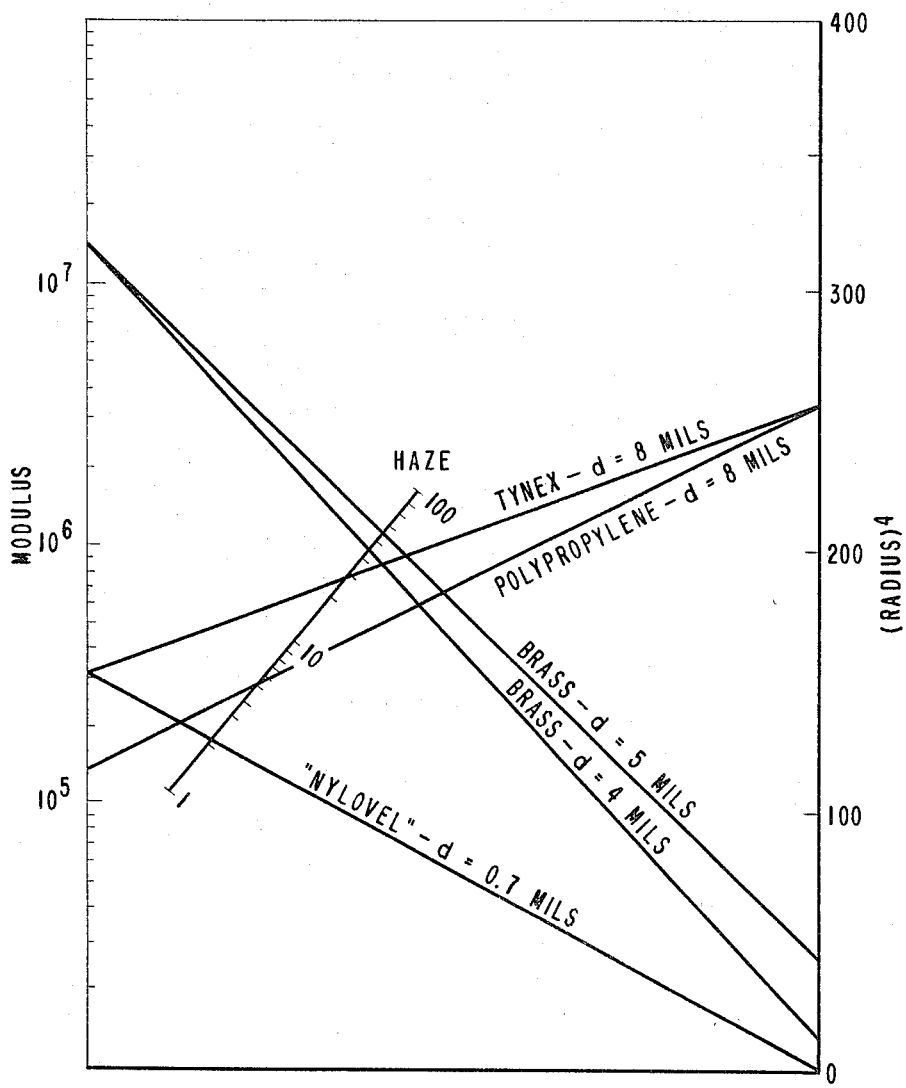
FIG. 4 is a nomograph or alignment chart which may be employed as a guide for determining the utility herein of non-metallic brush materials.

Referring to the drawings, FIG. 1 depicts free span brushing which, being less susceptible to chattering, is the preferred arrangement for treating light gauge (thin) film. In this arrangement, film 10 passes over counter rotated brush 11 which is driven at a speed preferably much greater than the film speed. The film is guided by roller 13 and roller 14 which have peripheral speeds equal to the lineal speed of the film, so that slight pressure is exerted by the film against the brush, and at least a small angle of wrap results.

Nip roll brushing, which is preferred for the softer more stretchable films, such as polyethylene, is shown in FIG. 2. In this arrangement, film 10 passes over driven brush 11, rotated in a direction counter to the direction of film travel, and is nipped between roll 12 and the brush. Roll 12 has a peripheral speed which is ordinarily the same as the film speed, but brush 11 is driven at a speed which is much greater than the film speed.

It is critical to the process of this invention that surface buffing of the film be carried out with a brush having non-metallic bristles or fibers. Wire bristle (or fiber) brushes, even the softest brass fibers brushes available, with a minimum contact, produce objectionable surface haze. This is consistent with U.S. Patent 2,951,305 which teaches the use of metal fiber brushes for dulling the surface of polyethylene terephthalate films. The result achieved by the present invention is a substantial reduction in friction without appreciable alteration of optical qualities, i.e., haze. It is shown, as illustrated in the curve of FIG. 3, which for convenience is plotted on a semilogarithmic scale, that gloss and haze are related. Accordingly, the process of the older patent, which dulls films (reduces gloss) also increases haze. Further, it is found that with thinner films such as 0.15 mil and 0.25 mil films, in which poor slip is a serious problem, even the softest metal brushes tend to produce frequent perforations, which prevent use of the film in certan types of packaging and for electric capacitors.

While non-metallic fibers in general are operable in brushes for purposes of the present invention, care must, of course, be exercised to select fiber having parameters to suit the film to be brushed (buffed). The major factors to be considered are: (a) the melting point of the fiber of the brush; (b) the elastic modulus of the material of the fiber; and (c) the diameter of the fiber. Effective brushes may employ vegetable fibers, animal fibers, or synthetic organic fibers. The criticality of the factors and the adaptability of each of the materials can be understood upon consideration of the character of the surface produced, some typical results and a possible mechanism involved.

Examination of photomicrographs (magnfications of 500× and 1175×) of the surface of a typical low haze, good slip film which has been brushed or buffed according to the present invention reveals a characteristic structure. Those specimens which are shadowed with aluminum to make the surface contours visible according to techniques known in the art, from a low angle (ranging from arc tangent $1/10$ to $1/2$) transverse to the direction of brushing reveal parallel ridges and valleys of low amplitude. The peaks of the ridges and the troughs of the valleys appear well rounded, with only rarely a deep trough which might be visible to the naked eye. Specimens shadowed in a direction parallel to the direction of brushing reveal a very fine, i.e., microscopic, orange peel surface. Apparently this orange peel surface is superimposed on the ridges and valleys and smooths out any abruptness or jagged edges which otherwise might exist from the action of the brush.

The foregoing qualitative description of the surface has utility in postulation of a mechanism for the action of brushes to produce the desired effect; a more quantitative evaluation of the surface is more revealing with regard to critical features. Such a quantitative evaluation, which includes the dimensions and number of asperities, can be accomplished by optical methods including the electron microscope. Examination of the surface with an interference surface tester (Ziess) which has a magnification of 50× can resolve the average height of asperities to a minimum of 1 microinch; the asperities resulting from the preferred brushes are not resolved by this instrument, therefore, it is concluded that the preferred process (brushing with a nylon velvet, as described hereinafter) gives an average height of less than 1 microinch. Acceptable films according to the present invention has average peak to valley heights of up to 5 microinches as measured by this instrument, but those brushed with brushes having large diameters, non-metallic fibers of stiff materials (e.g. nylon bristles of 8 mil diameter) have an average height greater than 5 microinches. Metallic bristles produce asperities which are too coarse for this instrument, but are revealed by the ordinary light microscopy at 400× to have an average height greater than 30 microinches. This surface is dull and hazy to the naked eye. Electron photomicrographs with a magnification of greater than 5,000× are capable of resolving asperities of a height less than 1 microinch, and reveal that preferred brushing produces surfaces with a peak to valley height as small as 0.1 microinch. Such samples have good slip and very low haze.

It is quite obvious a minimum number of asperities of these dimensions would be required to effect a reduction in friction. Therefore, the number of asperities per square inch is determined on samples of film having satisfactory slip and haze. These samples, shadowed with aluminum at a low angle (arc tan=$1/4$) and examined with a microscope at 500× revealed a minimum of $1 \times 10^6$ asperities per square inch with counts as high as $1 \times 10^9$ per square inch. This magnification resolves the largest acceptable asperities, therefore at least $1 \times 10^6$ asperities per square inch of an average height of up to 1 microinch is preferred, with an upper limit of 5 microinch average height acceptable.

Various brushes employed on different materials further reveal the criticality of certain features of the present invention. These are illustrated in Table I in which specimens of a 1 mil film of biaxially oriented, heat set polyethylene terephthalate were brushed at peripheral brush speed 4400 to 5200 feet per minute with the brushes as indicated.

TABLE I

| | Brush | | Film | | |
|---|---|---|---|---|---|
| Fiber Material | Elastic Modulus ×10⁵, p.s.i. | Fiber Diam. (mils) | Coeff. Frict. | Total Haze | 85° Gloss |
| Control | | | ¹>0.86 | 0.5 | 98 |
| Polyethylene | 0.4 | 21.0 | 0.58 | 6.7 | 95 |
| Tampico | 5.0 | 3.5 | 0.38 | 5.0 | 96 |
| Polypropylene | 1.6 | 8.0 | 0.42 | 4.3 | 95 |
| Tynex ² | 3.3 | 8.0 | 0.57 | 36.0 | 81 |
| Cotton String | 3.0 | ³ 4.0 | 0.45 | 1.5 | 98 |
| Brass Wire | 130 | 4.0 | 0.58 | 46 | 78 |
| Brass Wire | 130 | 5.0 | 0.58 | 61 | 47 |

¹ Maximum limit of apparatus.
² Du Pont trademark for nylon filament brush bristles.
³ Diameter of individual strands of twisted string.

In the foregoing table the values of elastic modulus are determined by ASTM method D747.

Coefficient of friction was measured as follows: A 2″ × 5″ piece of film is wrapped around a horizontal steel cylinder which is equipped with means for driven rotation about its axis. A second strip of film, 8½″ × 1½″, with a weight attached to one end is draped over the strip which wraps the cylinder. The other end of the second strip is attached through a suitable spring to a strain gauge which has its output coupled to an appropriately calibrated recorder. The cylinder is rotated slowly by an electric motor, with suitable gear reduction, at a peripheral speed of 0.1 cm./sec. The force measured at the point of slip is the force of friction. The coefficient of friction is computed from the formula:

$$T = T_0 e^{\mu\theta}$$

where $T$ = force of friction
$T_0$ = an initial load of 50 grams on the film hung over the cylinder
$\theta$ = angle of wrap in radia
$\mu$ = coefficient of friction or $$\mu = \frac{2.3}{\theta} \log \frac{T}{T_0}$$

Measurements of total haze were made with a Gardner haze meter according to ASTM method D–1003. Haze is the percentage of incident light scattered outside the solid angle 2.5°, i.e., ±1.25° from the incident beam.

These data from Table I illustrate the significance of the parameters which determine the performance of brushes. All of the brushes produce satisfactory slip, but only non-metallic brushes are capable of production of good slip with low haze values. Further, the haze values vary considerably between different materials of substantially the same fiber diameter, and likewise with the same materials and varied fiber diameter. Accordingly, the resulting haze is used as a criterion to determine brush utility.

Referring again to Table I, it is seen that haze decreases with decreasing diameter of the fiber, and with decreasing elastic modulus of the fiber. Elastic modulus appears to be the major variable in the behavior at impact of the fiber with the film, as discussed hereinafter. Based on data of the type of this table, brushes may be screened and utility predicted for any particular brush by means of a nomograph or an alignment chart (FIG. 4) constructed from the measured elastic modulus, and the measured diameter of the fibers along with haze produced by test brushes. The test brushes employed in establishment of the nomograph need not produce haze within the required range, and may be of materials differing from the material of a brush in question. The test measurements to establish the nomograph, however, should preferably be made with the film to be treated. The steps followed in construction of the nomograph or alignment chart are as follows:

(1) Specimens of the film to be treated are brushed with brushes having a known value of elastic modulus (which may be found in standard literature sources or determined by ASTM method D747), and a measured fiber radius, with a measurement of resulting haze.
(2) The procedure is repeated with different brushes so as to provide at least two each of modulus and radius values and at least three haze values.
(3) Establishment of a nomograph with parallel vertical axes with a scale representing modulus values in powers of ten, and diameter values in a uniform scale representing the fourth power of fiber radius. The range of each scale should include to the maximum and minima of the parameter values or their function (e.g., radius to fourth power) under test; corresponding values of elastic modulus and radius to the fourth power for each fiber are coupled by a straight line for each measurement; a logarithmic scale is fitted by means of a converging logarithmic scale so as to incorporate at least three haze values to the scale and uniquely define its location and interval; and extrapolation of the logarithmic haze scale from at least 1 to 100.
(4) Selecting a fiber for a brush on the basis of the maximum acceptable haze value by means of a straight line coupling a known value of diameter or modulus, the maximum permissible haze, with the line intersecting the unknown value of modulus or radius to the fourth power which defines the brush.

The nomograph can be constructed according to the principles outlined in standard texts on nomography for empirical relationships (Perry's Handbook of Chemical Engineering lists a number of these, and outlines general methods). The method outlined here, however, utilizes the data without recourse to an empirical equation to represent the relationship of the variables.

The mechanism now to be postulated is based upon the character of the surface of films of low haze and low friction produced according to the present invention, and upon the action of various brushes on films. This postulated mechanism is presented to facilitate understanding the invention, however, and is not to be considered binding or limiting upon the invention. A particular revealing feature is the orange-peel structure of the surface as viewed with a microscope after shadowing in the brushed direction (MD). This indicates surface softening with microscopic flow to heal any sharp edges produced by the brushes, and to round the peaks of the ridges and the bottoms of the valleys initially produced by the fibers. This rounding and the resulting low amplitude wavy surface reduces light scattering by these surface features and allows a greater extent surface modification without harmful production of haze. The inability to achieve good slip with low haze by means of metallic fiber brushes apparently results from two features attributable to the metallic fiber: the thermal conductivity and the hardness, or modulus of elasticity. (For the fiber materials there is a correlation between hardness and modulus of elasticity, however, it appears that the latter is adequately descriptive of the action of the brush.) The role of thermal conductivity appears in the action of the brush to heat the surface; the non-metallic fibers on impact with the surface tend to cause local heating at the point of contact, and by virtue of their relatively low thermal conductivity, as compared to the metallic fibers, the heat is localized, causing the softening of a microscopic layer of the film. This softening permits the surface which has been distorted slightly by the fibers or bristles to assume at least part of the low haze contour. Metallic fibers, by virtue of their hardness, cut in more deeply, and by virtue of their high thermal conductivity conduct the heat away and do not permit sufficient local heating of the film surface for softening to occur. Further, very large diameter fibers, although of a modulus of the order of the film (or even an order of magnitude less) can produce excessive haze, since the overall rigidity at the point of impact with the film may be sufficient to cause excessive distortion. With the local heating effect this will produce a surface of low friction, but with a contour which can result in increased haze.

The length of the fibers and the packing density are not critical so long as the individual fibers stand essentially erect with the brush stationary. The stiffness of the entire length of the fiber appears not to be as important as the resiliency of the portion in immediate contact with the film. Fibers, or bristles should preferably be packed sufficiently dense on the periphery of the brush so that uniform contact of the brush with the film is maintained, and that no areas of the film are untouched by the fibers of the brush. This implies considerable overlap of the bristles and lateral contact among the bristles at impact with the film. Consistent with this, brushes, constructed by wrapping pile or velvet fabrics around a drum and cementing the fabric thereto, are preferred. A preferred material is a nylon velvet (e.g., "Nylovel," manufactured by Martin Fabrics, New York, N.Y.) having a fiber length of 1/16 inch and a diameter of 0.7 mil. Such a brush provides, for example, a coefficient of friction of 0.35 and a haze of 2.5% with oriented polyethylene terephthalate film. Similar results may be achieved with cotton velvets. Goat hair is also useful.

The superiority of the velvet-like materials appears to be a result of the uniformity of the surface of the fibers. This maintains uniform pressure on the film and minimizes the formation of unsightly scratches. Therefore, velvets such as nylon velvets with relatively short fibers of small diameter, densely packed and uniformly traversed provide the most preferred brush material, and produce outstandingly good slip and low haze.

The extent of buffing, that is the pressure of contact and the time of contact are not especially critical and are readily determined by the skilled operator. It is quite obvious that if contact time of the film with the brush is unduly prolonged, diminishing returns will be obtained and excessive haze may result without further improvement in frictional properties. Frequently haze, as measured by methods set forth herein, will not increase appreciably with contact time, but the overall appearance of the film will be marred by relatively large and unsightly scratches. The determination of the proper pressure is also easily determined; with most brushes this is not particularly critical, however, for those brushes or buffing drums constructed of soft, deep pile fabrics, such as of acrylic fibers of small diameter, higher contact pressure, or loading is required to achieve improvement of slip.

While the examples incorporated in Table I illustrate the utility of the present invention with films of polyethylene terephthalate, the invention is also applicable to films of other thermoplastic organic materials as indicated in Table II. These films were brushed at 4400 ft./min.

TABLE II.—VARIOUS FILMS BRUSHED WITH SOFT COTTON CORD BRUSH, 10" DIAMETER

[Fiber modulus of elasticity 3×10⁵ p.s.i., diameter 4 mils]

|  | Control | Brushed |
| --- | --- | --- |
| Melinex "O" (Biaxially oriented polyethylene terephthalate):[1] | | |
| Coef. of Friction | >0.86 | 0.41 |
| Total Haze, percent | 0.5 | 1.4 |
| "Terafilm"[2] (Biaxially oriented): | | |
| Coef. of Friction | >0.86 | 0.44 |
| Total Haze, percent | 0.5 | 0.9 |
| Cellulose Acetate: | | |
| Coef. of Friction | >0.86 | 0.61 |
| Total Haze, percent | 0.7 | 1.1 |
| Polypropylene ("Moplefan"[3]): | | |
| Coef. of Friction | >0.86 | 0.40 |
| Total Haze, percent | 0.7 | 4.4 |
| Saran-coated Cellophane: | | |
| Coef. of Friction | >0.86 | 0.56 |
| Total Haze, percent | 1.7 | 4.7 |

[1] Imperial Chemical Industries Ltd.
[2] Acme Backing Co. Trademark for its Polyester Film.
[3] Montecatini Trademark for Polyolefin Film.

The initial haze levels of the films in Table II largely consist of internal haze; the haze level of the brushed film being higher by the extent of surface haze caused by brushing. An example of the increase in haze of a film by brushing and its effects is afforded by the brushing of a hazy, biaxially oriented, heat-set film of polyethylene terephthalate with a nylon velvet brush driven at a peripheral speed of 4400 feet per minute with respect to the film. The film sample has an initial coefficient of friction of 0.75, and initial internal haze of 13.4% with a negligible surface haze (e.g. less than 0.1%). After brushing the coefficient of friction was 0.34, the total haze 15.7, representing a surface haze increase of 2.3%. A similar film with an initial haze of 10.2% was brushed three times to raise the haze level to 16.6%, an increase of 6.4%; handling this film produced vivid finger marks on the brushed side, and negligible marks on the unbrushed surface.

Also vinyl films, "Saran" (polyvinylidene chloride, Dow Chemical Co.), "Aclar" (fluorohalocarbon film; Allied Chemical Corp.) and other brands of polyolefin films was brushed according to the present invention with satisfactory results, i.e. good slip and low haze.

It is apparent from the foregoing description that the present invention has significant advantages over the two existing means of providing good slip, i.e., high hazing and embossing. High haze, while providing good slip by means of surface irregularities is unsuitable for many packaging applications and for advanced types of magnetic tape recording. The present invention provides the desired low friction without production of obvious optical effects or surface irregularities which cause these deficiencies. Secondly, in comparison to embossing, the present invention is advantageous in that it can be applied to any finished thermoplastic film, without harmful effects on the physical properties, such as may occur with oriented films. The equipment is low cost and easily installed on the process line, or in the plant of a converter.

Furthermore, it is recognized that for some purposes films which have initially low transparency or high haze require improvement in slip properties; the present invention can provide such improvement without production of high surface haze which would be unsuitable for some uses, such as for magnetic recording, where smooth surfaces are required.

I claim:
1. As a new article of manufacture an organic thermoplastic film having a buffed surface, said surface having at least 1×10⁶ asperities per square inch of surface, said asperities having a maximum average height of 5 microinches; said surface further characterized by microscopic orange peel structure, a surface haze of less than 6%, and a coefficient of friction of less than 0.6.
2. The article of claim 1 wherein said film is transparent.
3. The article of claim 1 wherein said film is oriented polyethylene terephthalate film.
4. A process for improving the surface slip characteristics of thermoplastic organic film which comprises uniformly brushing the surface of themoplastic organic film with a brush, the fibers of said brush being of a non-metallic material having an elastic modulus within an order of magnitude of the elastic modulus of said film and less than 2×10⁶ pounds per square inch, and remaining substantially the same while in contact with said film.
5. A process for improving the surface slip characteristics of thermoplastic organic film which comprises contacting the surface of a traveling web of thermoplastic organic film with a driven rotary cylindrical brush rotated in a direction opposite to the direction of travel of the film, the fibers of said brush being of a non-metallic material having an elastic modulus within an order of magnitude of the elastic modulus of said film and less than 2×10⁶ pounds per square inch, and remaining substantially the same while in contact with said film.
6. The process of claim 5 wherein the film is transparent polyethylene terephthalate film.
7. The process of claim 5 wherein said brush is a cylindrical drum the outer curved surface of which is covered with a pile fabric.
8. The process of claim 7 wherein the pile fabric is nylon velvet having a pile depth of about 1/16 of an inch, and a fiber diameter of about 0.7 mil.

References Cited by the Examiner

UNITED STATES PATENTS

| | | | |
| --- | --- | --- | --- |
| 1,881,337 | 10/1932 | Willis | 156—153 X |
| 2,951,305 | 9/1960 | Seymour | 156—154 |
| 3,041,193 | 6/1962 | Hammay et al. | |

ALEXANDER WYMAN, *Primary Examiner.*

MORRIS SUSSMAN, *Examiner.*